S. D. McEACHERN.
COTTON PICKER.
APPLICATION FILED APR. 19, 1917.
1,297,376. Patented Mar. 18, 1919.
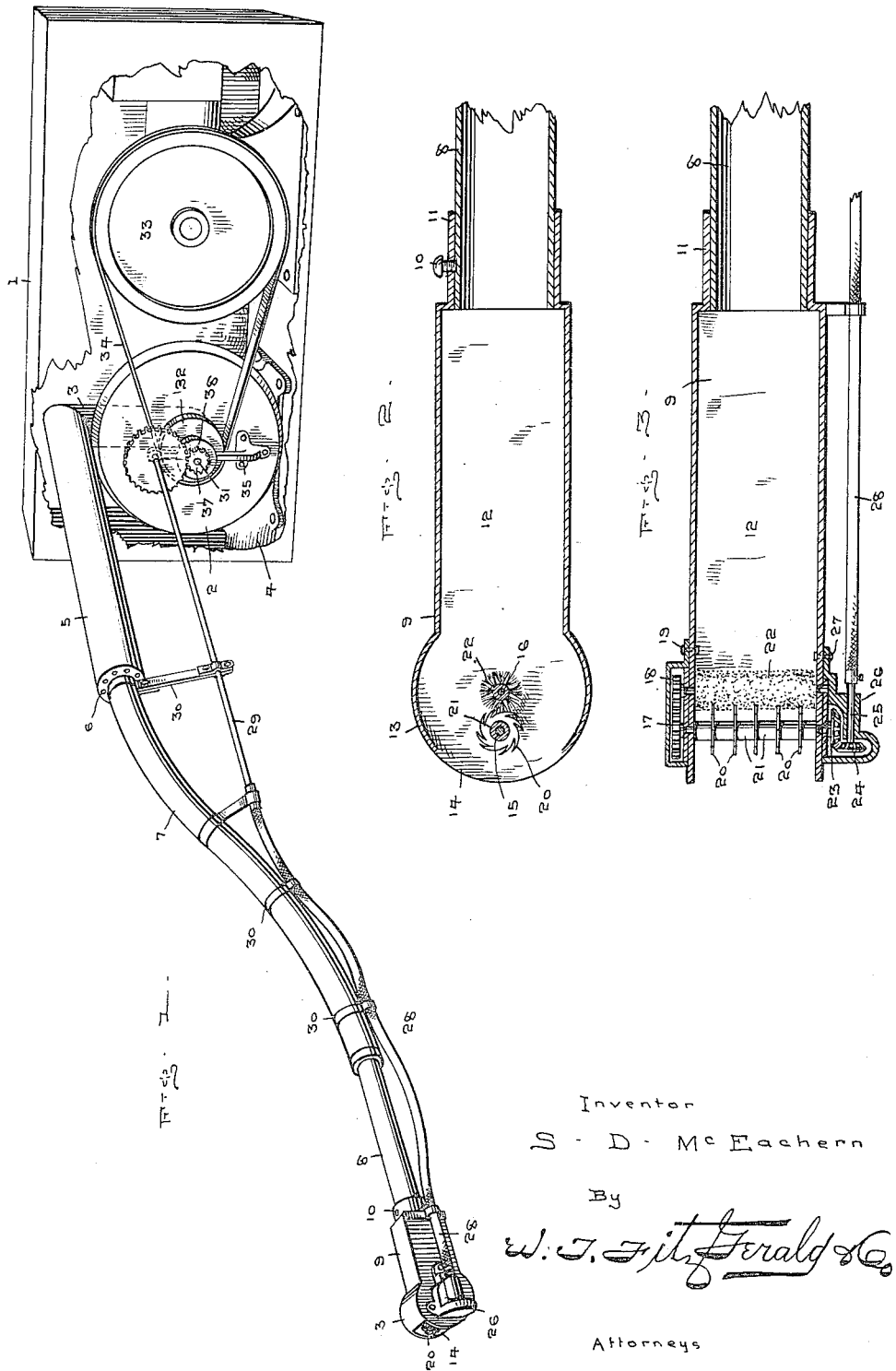
Inventor
S. D. McEachern
By
W. T. Fitzgerald &Co.
Attorneys

UNITED STATES PATENT OFFICE.

SAMUEL D. McEACHERN, OF JAYTON, TEXAS.

COTTON-PICKER.

1,297,376.  Specification of Letters Patent.  Patented Mar. 18, 1919.

Application filed April 19, 1917. Serial No. 163,245.

*To all whom it may concern:*

Be it known that I, SAMUEL D. McEACHERN, a citizen of the United States, residing at Jayton, in the county of Kent and State of Texas, have invented certain new and useful Improvements in Cotton-Pickers; and I do hereby declare the following to be a full, clear, and exact description of the invention, such as will enable others skilled in the art to which it appertains to make and use the same.

This invention relates to a cotton picker and has for its primary object to provide one which can be readily mounted upon a vehicle so that it can be conveniently drawn between the rows of cotton stalks to enable a person to use the same for picking or gathering a maximum amount of cotton in a minimum amount of time.

A further object of the invention is to provide a portable casing in which is arranged a suction blower and suitable power driving means, the suction blower having a flexible pipe extending therefrom to the outer end of which is attached a suction head in which is arranged suitable picking means operated directly from the suction blower so that when the flexible pipe is grasped within the operator's hand and the suction head moved into close proximity to the cotton pod, the cotton will be quickly picked from the pod and conveyed through the suction blower and subsequently deposited in the vehicle carrying the device.

A further object of the invention is to provide a suction head in which is arranged a plurality of cotton saws or pickers and a rotary brush adjacent thereto which is designed to brush the cotton from the saw teeth after it has been picked from the pod so that it may be freely conveyed through the suction pipe attached to the suction head.

With these and other objects in view as will appear as the description proceeds, the invention comprises the various novel features of construction, combination and arrangement of parts, as will be more fully described hereinafter and set forth with particularity in the appended claim.

Referring to the drawings,

Figure 1 is a perspective view of my novel construction of cotton picker.

Fig. 2 is a vertical longitudinal sectional view through the suction head thereof, and Fig. 3 is a horizontal sectional view taken through the suction head.

Similar characters of reference are used to denote like parts throughout the accompanying drawings and the following description.

Referring more particularly to the drawings the reference numeral 1 represents a suitable casing in which is arranged a suction blower 2 which has connected centrally to it an intake pipe 3 and projecting tangentially from the suction blower is an outlet pipe 4 which projects through one end of the casing 1. The intake pipe 3 is provided with a right angular extension 5, the outer end of which is provided with a circumferential row of perforations for the admission of air. Since the suction pipe 7 is much smaller in diameter than the intake pipe 5 and by virtue of the relative size of the suction blower, it will be apparent that it is necessary to provide the perforations to reduce the suction force sufficient to permit it to effectively convey the cotton through the suction blower without liability of the same becoming clogged therein.

A flexible pipe 7 has one end attached to the outer end of the intake pipe 5 and concentrically of the apertures 6, the other end being attached to a hand pipe 8.

A suction head 9 is detachably connected to the outer end of the hand pipe 8 through the medium of a set screw 10 extending through the sleeve 11 projecting from the rear end of the suction head. The suction head in this instance is formed of a hollow elongated casing 12 which has its outer end enlarged as indicated by the numeral 13, and this enlarged end is provided with an entrance opening 14 through which the cotton is sucked.

Arranged transversely through the enlarged end 13 are a pair of shafts 15 and 16, which are operatively connected together by gears 17 arranged exteriorly of the casing and within a suitable house 18 that is secured to the casing by suitable fastening means 19. The shaft 15 has a plurality of cotton saws or pickers 20 arranged on it and held in spaced relation by sleeves 21 interposed between them, and fixed on the shaft 16 is a rotary brush 22, said brush serving to brush the cotton from the cotton saws immediately after they have picked it from the cotton pod so as to allow it to be quickly and readily conveyed through the suction pipe.

The opposite end of the shaft 15 is provided with a bevel gear 23 which meshes with a similar gear 24 secured to the inner end of a stub shaft 25 which latter is journaled in a suitable housing 26 and incloses the gears 23 and 24, this housing being secured to the casing 9 by suitable means 27.

The numeral 28 represents a flexible casing in which is arranged a flexible shaft, one end of which is attached to the stub shaft 25 while the other end is attached to a driving shaft 29, said shaft 29 and the flexible casing 28 being supported from the flexible pipe 7 by suitable means 30.

Mounted on and adjacent one end of the suction blower shaft 31 is a drive pulley 32 which is adapted to be driven by a gasolene engine or other suitable power means 33 through the medium of a drive belt 34. The outer end of the shaft 31 is journaled in a supporting bracket 35 secured at its lower end to the casing of the suction blower, and the upper end supports and journals the inner end of the shaft 29. The shaft 29 carries a gear 36 which meshes with a gear 37 fixed on the shaft 31, and arranged between the gear 37 and the bearing bracket 35 is a bearing disk 38.

From the foregoing description it will be apparent that when it is desired to operate the cotton picker, the motor 33 is started so as to revolve the cotton saws 20 and the brush 32, at the same time creating a suction through the suction head through the medium of the suction blower 2, whereby when the suction head is moved into close proximity to a cotton pod, the cotton will be quickly and readily picked and conveyed through the suction blower and subsequently disposed in the vehicle carrying the device.

By the provision of the cotton saws and the rotary brush, burs and other foreign material will be separated from the cotton and prevented from passing through the device with the cotton. If desirable the suction head can be removed from the hand pipe 8 and the device used to gather the cotton by suction only, but of course the cotton gathered will not be as clean and free from foreign material as with the use of the suction head.

What I claim is:

In a portable cotton picker of the class described, a suction blower having inlet and outlet pipes and embodying a driving shaft, a vertical bearing bracket mounted on one side of the suction blower having its intermediate portion enlarged to provide a bearing for the suction blower shaft, a driving pulley fixed on the suction blower shaft between said bearing bracket and the suction blower casing, a pinion fixed on the outer end of said driving shaft and adjacent the bearing bracket, a driven shaft having one end journaled in the upper end of said bearing bracket and its other end supported from the suction blower inlet pipe, and a gear fixed on said driven shaft and meshing with said pinion whereby the driven shaft may be driven directly from the suction blower shaft.

In testimony whereof I have signed my name to this specification in the presence of two subscribing witnesses.

SAMUEL D. McEACHERN.

Witnesses:
E. R. WINTER,
A. L. KELLEY.